United States Patent
Marcum

(10) Patent No.: US 7,891,107 B2
(45) Date of Patent: Feb. 22, 2011

(54) GAUGE FOR DETERMINING ANGLE OF SLOPED GROUND AND METHOD OF USING SAME

(76) Inventor: Timothy J. Marcum, P.O. Box 768, Beavercreek, OR (US) 97004

( * ) Notice: Subject to any disclaimer, the term of this patent is extended or adjusted under 35 U.S.C. 154(b) by 0 days.

(21) Appl. No.: 12/584,406

(22) Filed: Sep. 4, 2009

(65) Prior Publication Data

US 2009/0320308 A1 Dec. 31, 2009

Related U.S. Application Data

(63) Continuation-in-part of application No. 12/074,075, filed on Feb. 28, 2008, now Pat. No. 7,591,079.

(51) Int. Cl.
*G01B 5/20* (2006.01)
(52) U.S. Cl. ............... 33/521; 33/1 N; 33/1 SB
(58) Field of Classification Search .............. 33/1 H, 33/1 N, 1 SB, 521, 534, 563
See application file for complete search history.

(56) References Cited

U.S. PATENT DOCUMENTS

| | | | | |
|---|---|---|---|---|
| 4,454,654 A | * | 6/1984 | Mayer | 33/1 N |
| 4,625,409 A | * | 12/1986 | Arakawa | 33/1 N |
| 5,117,560 A | * | 6/1992 | Nevins | 33/471 |
| 5,896,671 A | * | 4/1999 | Yu | 33/1 SB |
| 6,457,247 B1 | * | 10/2002 | Lin | 33/1 N |
| 6,854,190 B1 | * | 2/2005 | Lohmann | 33/1 SB |
| 7,591,079 B1 | * | 9/2009 | Marcum | 33/521 |
| 2005/0210688 A1 | * | 9/2005 | Stephens | 33/1 N |
| 2010/0005672 A1 | * | 1/2010 | Cerwin | 33/1 N |
| 2010/0223798 A1 | * | 9/2010 | Zimmerman | 33/563 |

* cited by examiner

*Primary Examiner*—G. Bradley Bennett
(74) *Attorney, Agent, or Firm*—Chernoff Vilhauer

(57) ABSTRACT

A gauge for determining the angle of sloped ground includes a panel, having a transparent window located in it, which can be held by a user so that the sloped ground can be viewed through the window. The panel has a spatial reference associated with it which allows the panel to be oriented properly with respect to the horizontal or vertical. Inscribed on the window are a positioning indicia and a plurality of lines which radiate outwardly from the positioning indicia at specific angles with respect to the horizontal. In use the panel is held such that the positioning indicia is located on the slope. The user can then determine which one of the lines overlies the slope. The angle associated with that line is the angle of the slope.

12 Claims, 9 Drawing Sheets

US 7,891,107 B2

GAUGE FOR DETERMINING ANGLE OF SLOPED GROUND AND METHOD OF USING SAME

RELATED APPLICATIONS

This application is a continuation-in-part of application Ser. No. 12/074,075 filed Feb. 28, 2008 now U.S. Pat. No. 7,591,079.

BACKGROUND OF THE INVENTION

This invention relates to a gauge for determining the angle of sloped ground, and in particular for determining this angle with a hand-held gauge.

When a construction project creates a sloped section of ground the permissible angle of the slope relative to the horizontal or vertical is established by one or more standards in order to prevent cave-in. However, unless a surveyor is on site it is difficult to determine whether the angle of the slope falls within the applicable standard. Where the sloped sides are steep, the problem of determining the angles of the sloped sides is even more difficult because a person cannot stand on the sloped side walls without fear of causing a cave-in. In many types of excavation it is even dangerous to stand at the bottom of the excavation.

Inclinometers can be used to measure excavation slopes but they have inherent problems. Inclinometers will only measure the angle of a small portion of a slope. However, ground slopes by their nature are uneven. As a result, with an inclinometer it is necessary to take multiple measurements while standing on the slope and then average them.

SUMMARY OF THE INVENTION

The subject invention provides a hand-held gauge for determining the angle of sloped ground. The gauge comprises a panel having a transparent window through which the user can view the sloped surface. The panel includes a spatial reference which allows the gauge to be properly oriented relative to the horizontal or vertical. The window has a positioning indicia inscribed on it and a plurality of lines radiate outwardly from the positioning indicia at specific angles with respect to the spatial reference. A user holds the gauge so that the slope can be viewed through the window and the gauge is oriented such that the spatial reference indicates that the gauge is aligned horizontally or vertically and the positioning indicia overlies a point on the slope. The viewer can then determine which of the lines overlies the slope, and as a result, the angle of the slope.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
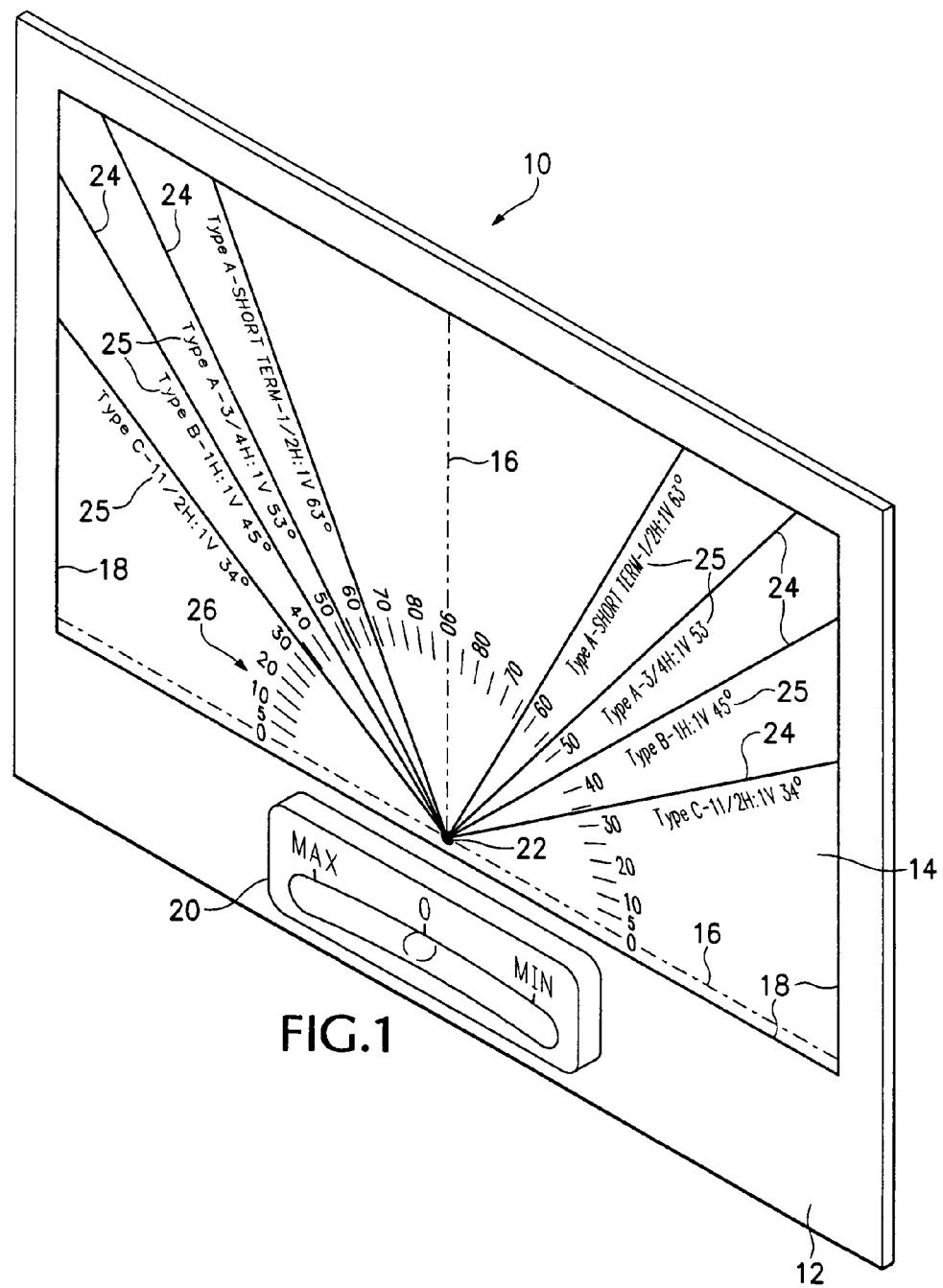
FIG. 1 is a perspective view of a gauge for determining angles of sloped ground embodying the subject invention.

Referring now to the drawings, a gauge 10 is used for determining the angle of sloped ground. The gauge comprises a panel 12 which is arranged to be held in a user's hand, FIGS. 2 and 3, and has a transparent window 14 which the user can see through. In the embodiment illustrated the entire panel 12 is transparent and preferably is made from a thin sheet of plastic, such as polycarbonate. The sheet needs to only be thick enough to be self-supporting. If desired those portions of the panel 12 that are not encompassed by the window 14 can be non-transparent and can be thicker than the window.

As will be more fully explained later, when in use the gauge needs to first be oriented relative to the horizontal or vertical. Accordingly, associated with the panel is a spatial reference which allows the panel to be properly oriented. This could be a line 16 which is inscribed in the window or an edge 18 of the window. This line or edge is aligned with a surface on the ground that is horizontal or vertical, or nearly horizontal or vertical. If it is desired to have more accuracy in orienting the panel a level, such as the bubble inclinometer 20 illustrated, it can be placed on the panel.

Located on the panel is a positioning indicia, which in the embodiment illustrated is a small dot 22. If the window is the only portion of the panel that is transparent the positioning indicia preferably would be located on the window 14, but it could be located on a non-transparent portion of the panel adjacent to the window. In the embodiment illustrated the positioning indicia is located near the bottom of the window generally at the horizontal center of the window. Also located on the window 14 are a series of lines 24 which project outwardly from the positioning indicia 22. The lines 24 are oriented at selected angles with respect to horizontal. The angles correspond to the angles specified in standards for ground slopes for surfaces such as the sides of a specific type of excavation, cut for roadway, slope of landscape area, etc. If desired a description 25 of the particular standard can be inscribed next to each line 24. Each line 24 can be of a different color so that a particular standard can readily be identified for comparing a slope against.

Preferably the lines 24 are arranged in pairs with one line in each pair radiating from the positioning indicia in each direction. This allows measuring both right and left side slopes of an excavation at the same time. If desired a protractor 26 can be inscribed on the window 14. The protractor preferably extends 90 degrees from both sides of the horizontal spatial reference line 16. Both the horizontal and vertical spatial reference lines preferably pass through the positioning indicia 22. In the preferred embodiment the various materials are printed on the window but they could be etched in the plastic, applied as a decal or any other method for accomplishing this.

Figure 2:
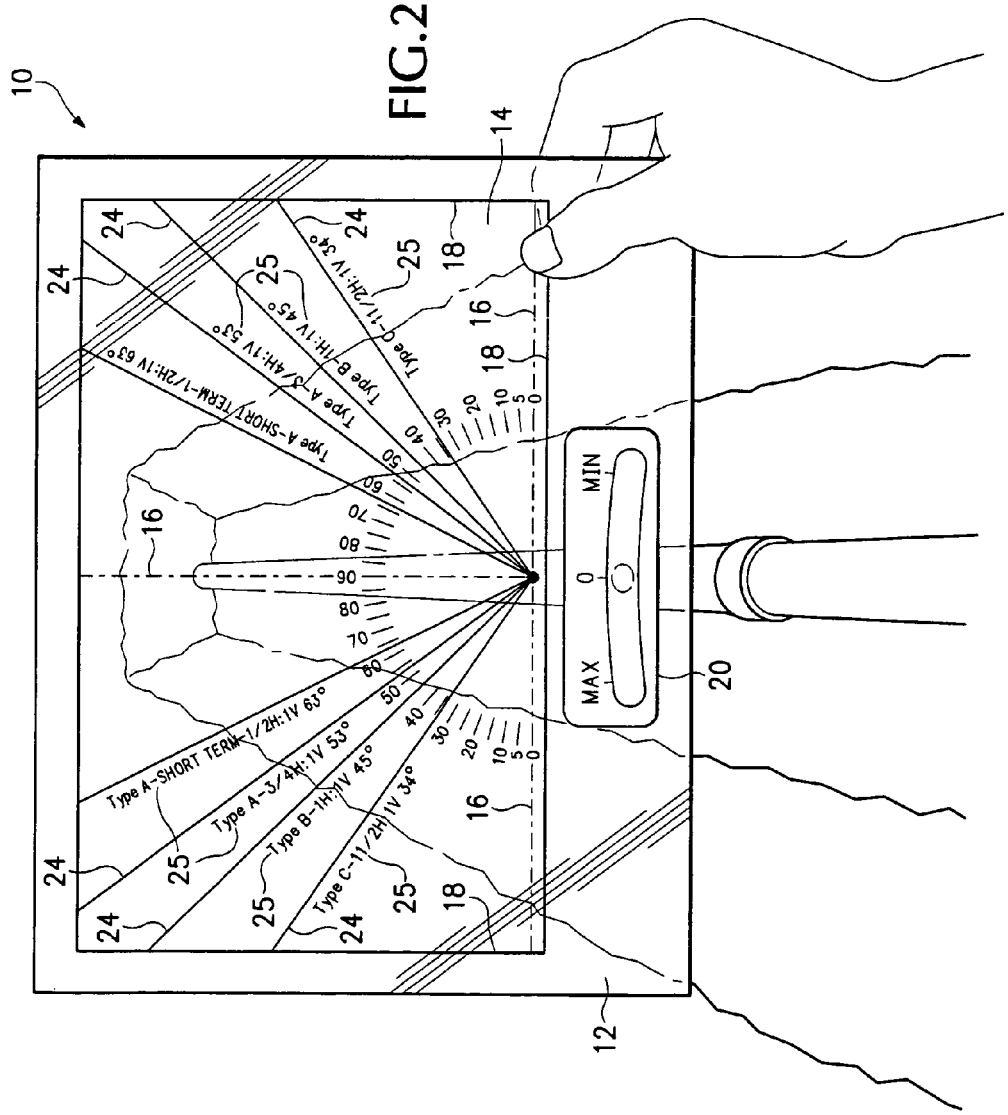
FIG. 2 is a perspective view of the gauge held over an excavation in a manner in which the angle of the slope on both sides of the excavation can be measured.
Figure 3:
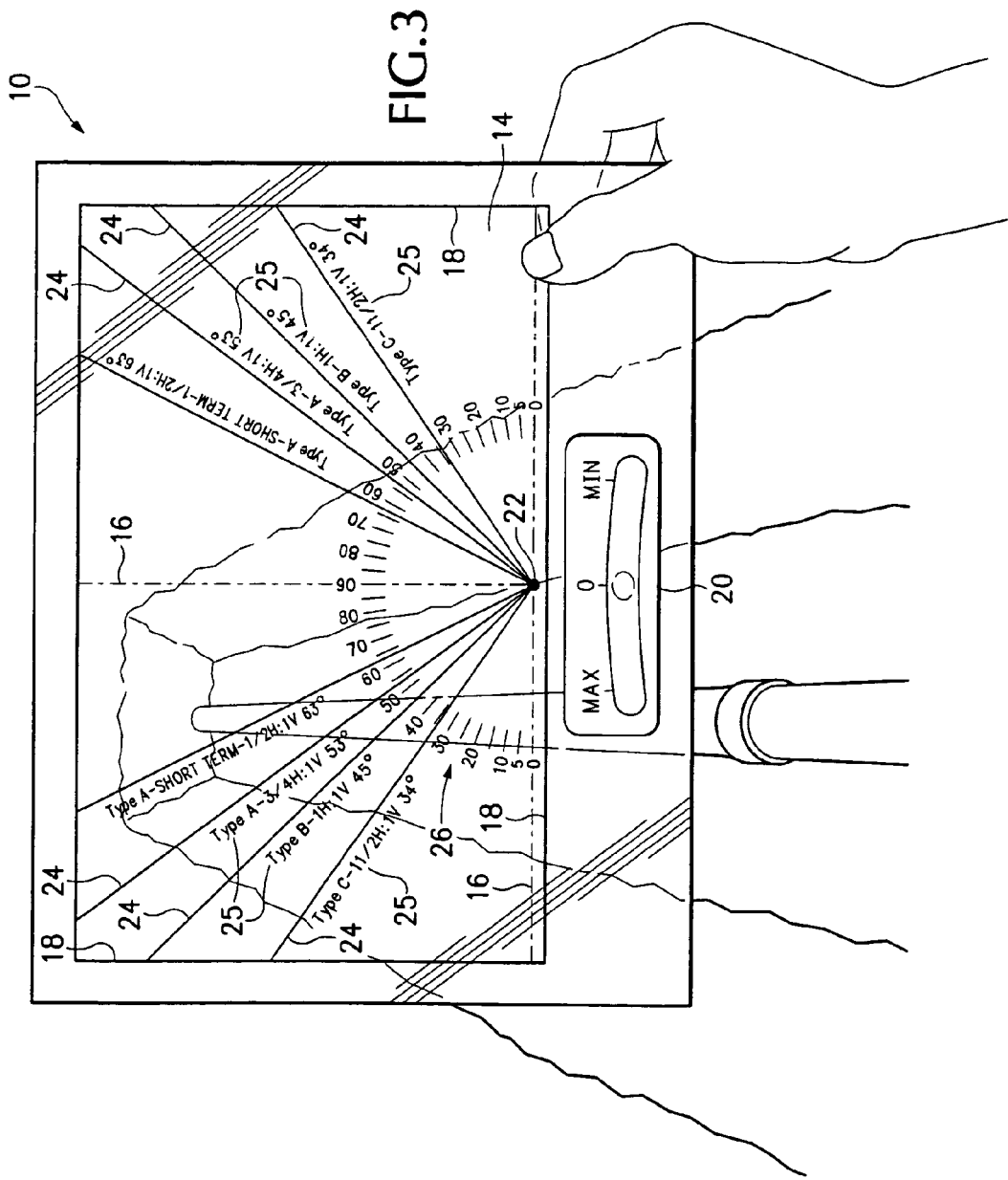
FIG. 3 is a perspective view similar to FIG. 2 except that the gauge is oriented to measure the slope on only one side of an excavation.

The gauge is used by holding it in front of the user, FIGS. 2 and 3. The spatial reference is used to orient the gauge. If a single slope is being measured, the gauge is positioned such that the positioning indicia 22 appears to be located on that slope, FIG. 3. If the gauge is being used to simultaneously measure the slope on both sides of an excavation, it is positioned such that the positioning indicia appears to be located at the center of the excavation, FIG. 2. In either case the line 24 that appears to be at a right angle α with the top of the excavation is the line that indicates the angle of the slope. If desired, an object 28, such as a rope or the ladder shown in FIG. 4, can be placed on the slope to increase the accuracy of the gauge.

Typically the user would be standing at the top of the slope, particularly with a narrow excavation which possibly could cave in and would be difficult to enter. Because the user is above the bottom of the slope and the positioning indicia is placed at the bottom of the slope, there is a slight amount of parallax and the lines may not provide the exact angle of the slope. It has been found, however, that this normally results in the slope being slightly less than indicated which means that the slope will normally be within the standard associated with that line. In a more open excavation or one with a shallower slope the user could stand at the bottom of the excavation.

While the foregoing refers to the gauge being used by a person standing, the gauge can be used many other ways. The user can be sitting in a vehicle or piece of construction equipment, or the gauge can be attached to the vehicle or equipment. The gauge can even be used under water by a diver. In addition it is not necessary for the user to have a completely clear line of sight to the slope being measured. Equipment, pipes, fencing, etc. located on or projecting into the view of the slope do not prevent the gauge from being used. All that is necessary is that the user can view enough of the slope to make a measurement.

Figure 4:
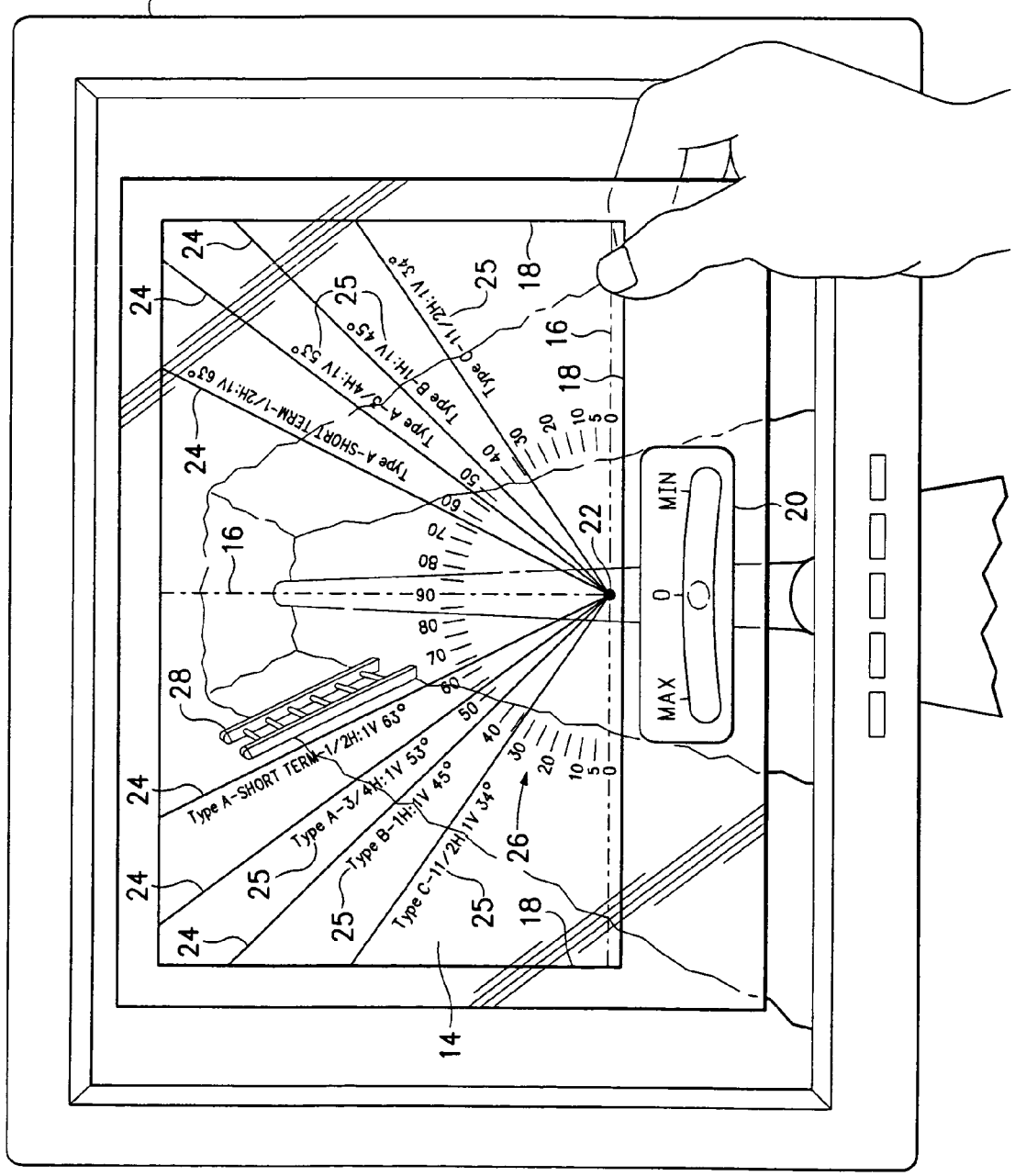
FIG. 4 is an elevation view showing the gauge held over an image of an excavation being displayed on a monitor.
Figure 5:
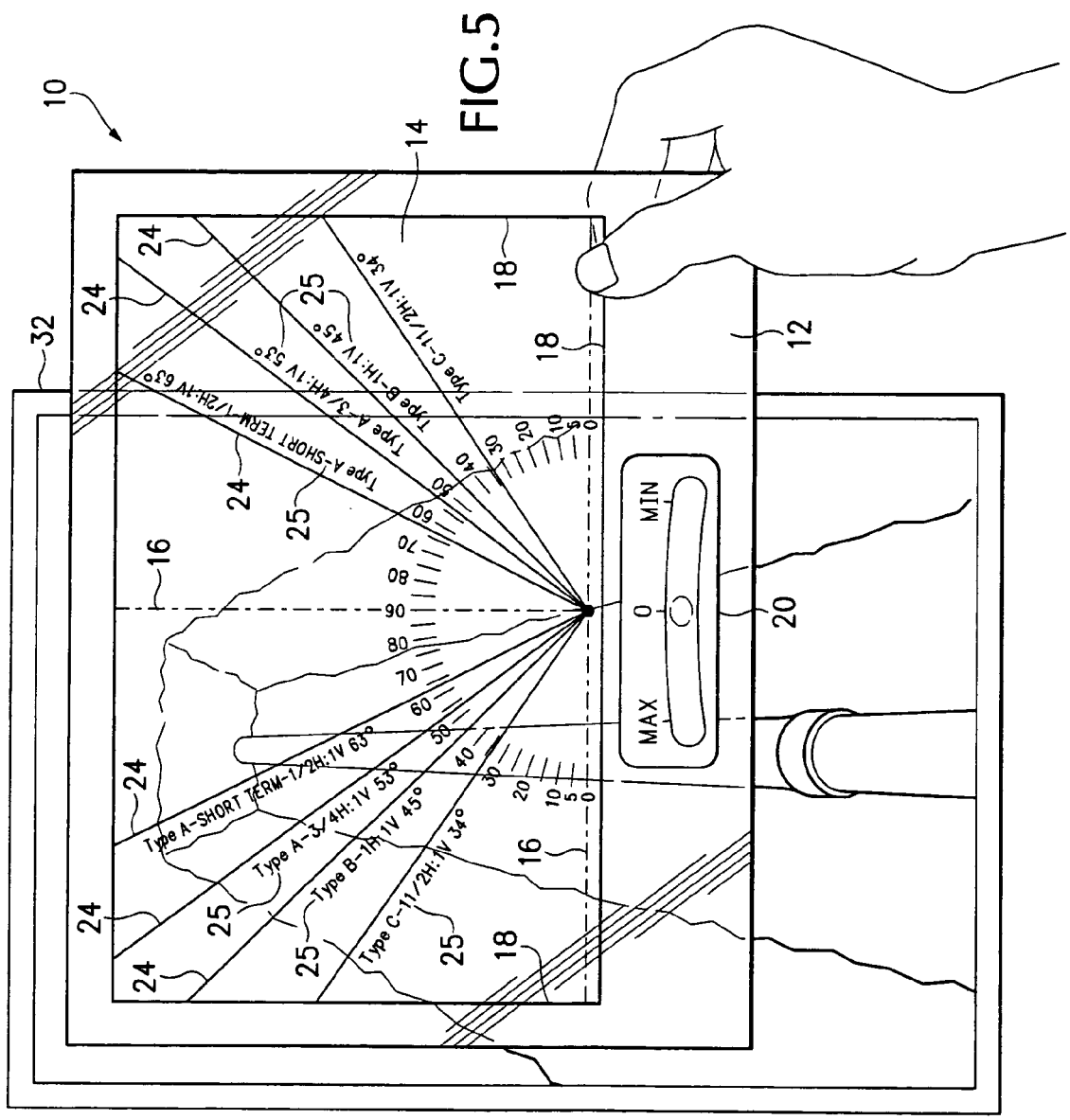
FIG. 5 is an elevation view showing the gauge overlying a photograph of an excavation.

The gauge 10 can also be used to measure the angle of a slope off-site. Referring to FIG. 4, one way of doing this is to lay the gauge over a monitor 30 which is displaying an image of the slope. The gauge is aligned and read much the same way as it is when it is used in the field. Referring to FIG. 5, another way of measuring a slope off-site is to lay the gauge over a photograph 32 of the slope. Again the gauge is aligned and read much the same way as it is when it is used in the field.

The gauge 10 also can be oriented as described above to determine the angle of a slope and a photograph can be taken of the gauge, showing the slope and the angle. This photograph then can be used to commemorate that the slope has been measured.

Referring now also to FIGS. 6-10, in addition to being used to determine whether sloped sides of a trench are at the correct angle, the gauge can be used to determine the angle between any rectilinear object and a specific reference line. The rectilinear object can be the vertical edge of a building, the side or top edge of a window frame, the side or top of a hung art piece, a fence post, etc. The specific reference line would typically be the horizontal or vertical but it could be anything. Typical uses would be to determine if something that is supposed to be vertical is out of plum, to determine if a tree being planted is vertical, to determine the pitch of a roof, for setting fence posts, for hanging cabinets, shelves and large art pieces or for building deck frames. Moreover, the foregoing can be done from a long distance.

Figure 6:
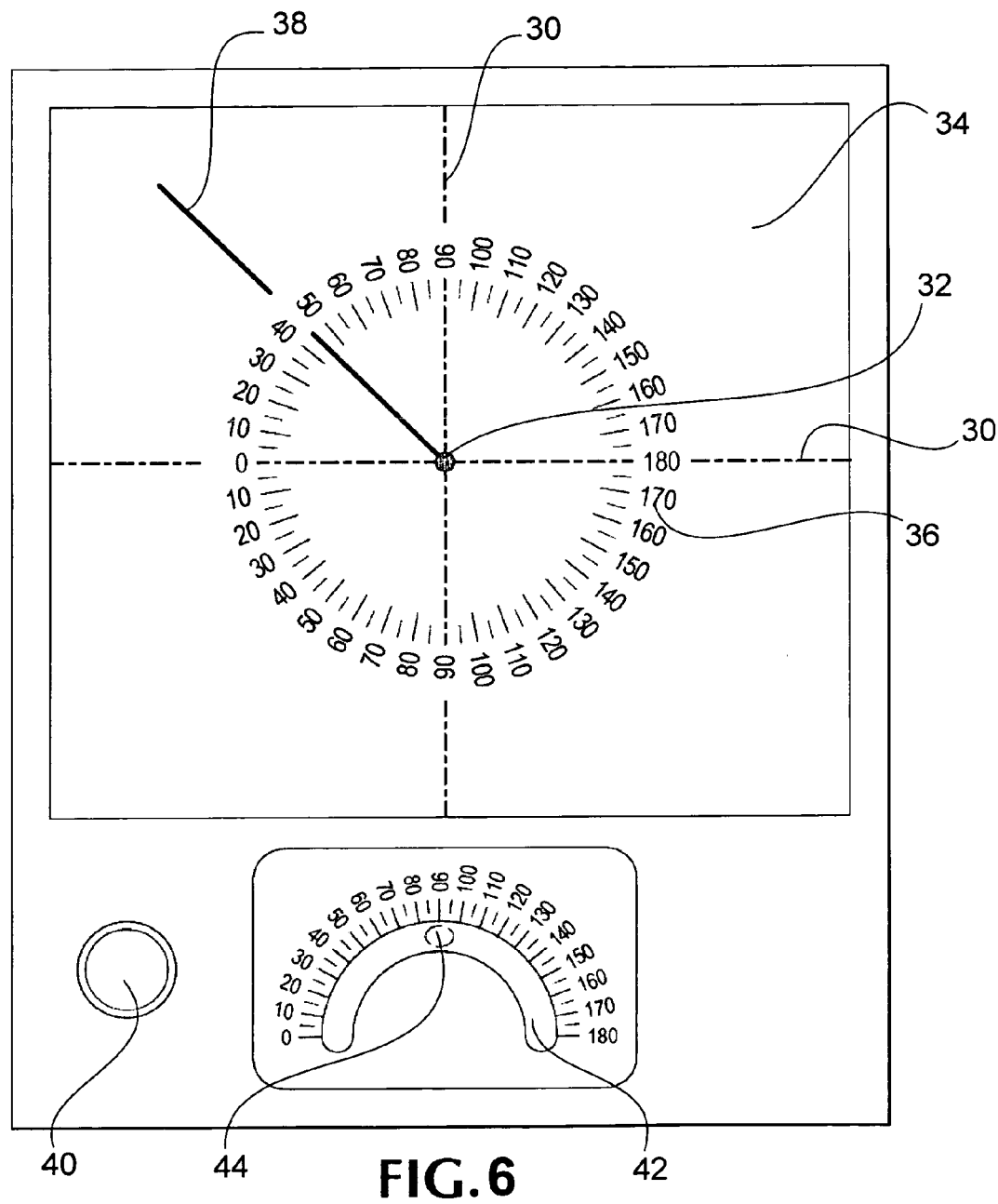
FIG. 6 is an elevation view of another embodiment of the invention.

The embodiment illustrated in FIG. 6 is a simplified device that can be used for accomplishing these functions. In this embodiment the horizontal and vertical spatial reference lines 30 intersect at the positioning indicia 32 near the center of the window 34 rather than near the bottom edge of the window. In addition the protractor 36 extends 360° around the positioning indicia 32. While in the embodiment illustration the protractor has two 180° sections it could be graduated in four 90° sections or a single 360° section. A marker 38 is rotatably mounted on the window to rotate 360° about the positioning indicia 32. The marker 38 is rotated by turning a knob 40 located on the gauge. In this embodiment the level 42 extends 90° on each side of vertical.

This embodiment can be used by aligning the horizontal spatial reference line 30 with a known horizontal line, or centering the bubble 44 in the level 42, while looking through the window and centering the positioning indicia 32 on the rectilinear object whose angle is being measured. The marker 38 is then aligned with the rectilinear object to give its angle relative to the horizontal. Alternatively, the vertical spatial reference line 30 can be aligned with a rectilinear object whose angle is being measured and the angle of the rectilinear object relative to the vertical can be determined by the angle indicated on the level 42.

Figure 7:
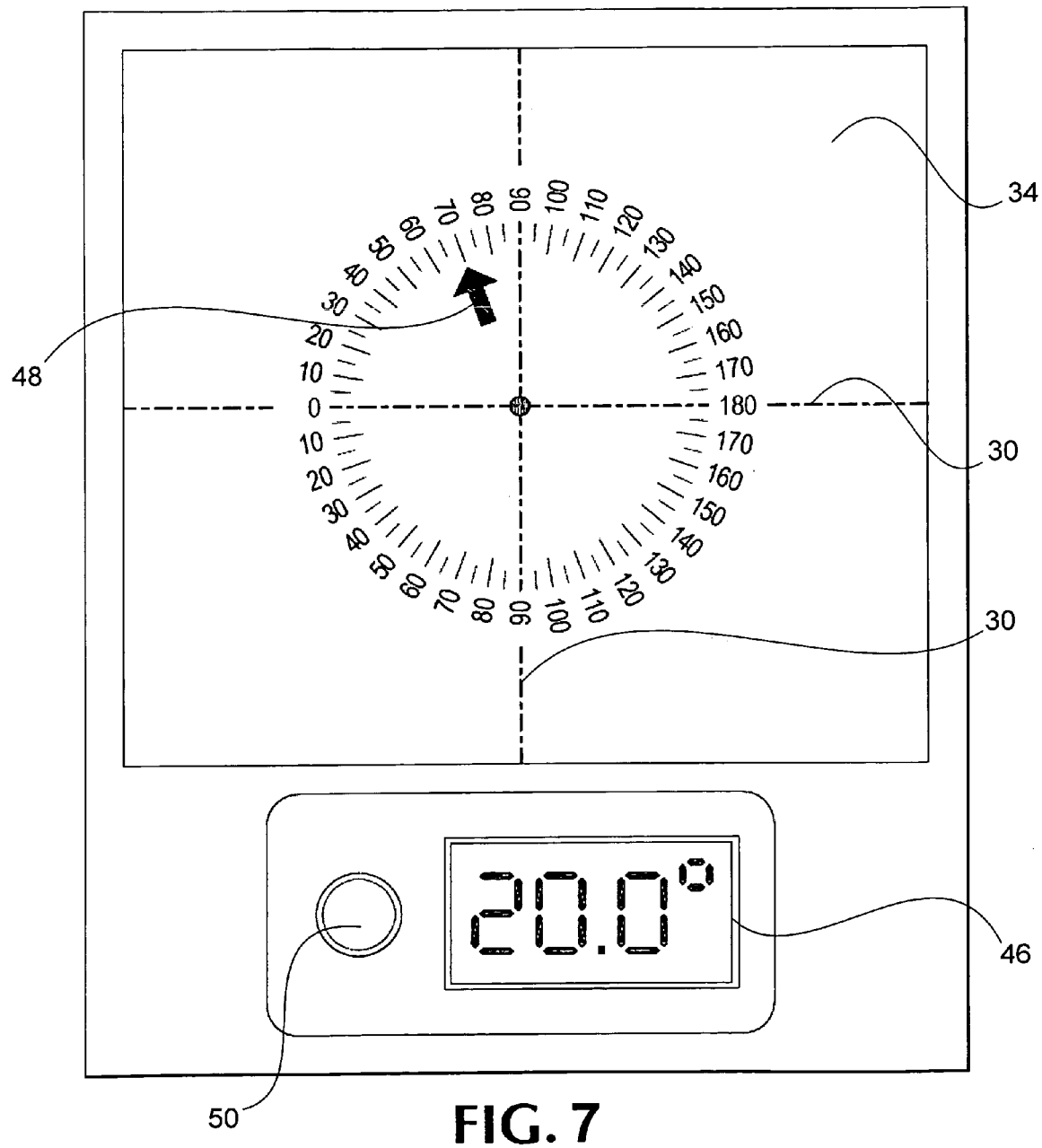
FIG. 7 is an elevation view of another embodiment of the invention.

Referring now to FIG. 7, the gauge can have a digital angle display 46. The digital angle display can serve as the spatial reference line by indicating the angle of an electronic level (not shown) is offset from horizontal. Alternatively, the digital display can display the angle of a digital marker 48 which is set by a knob 50.

Figure 8:
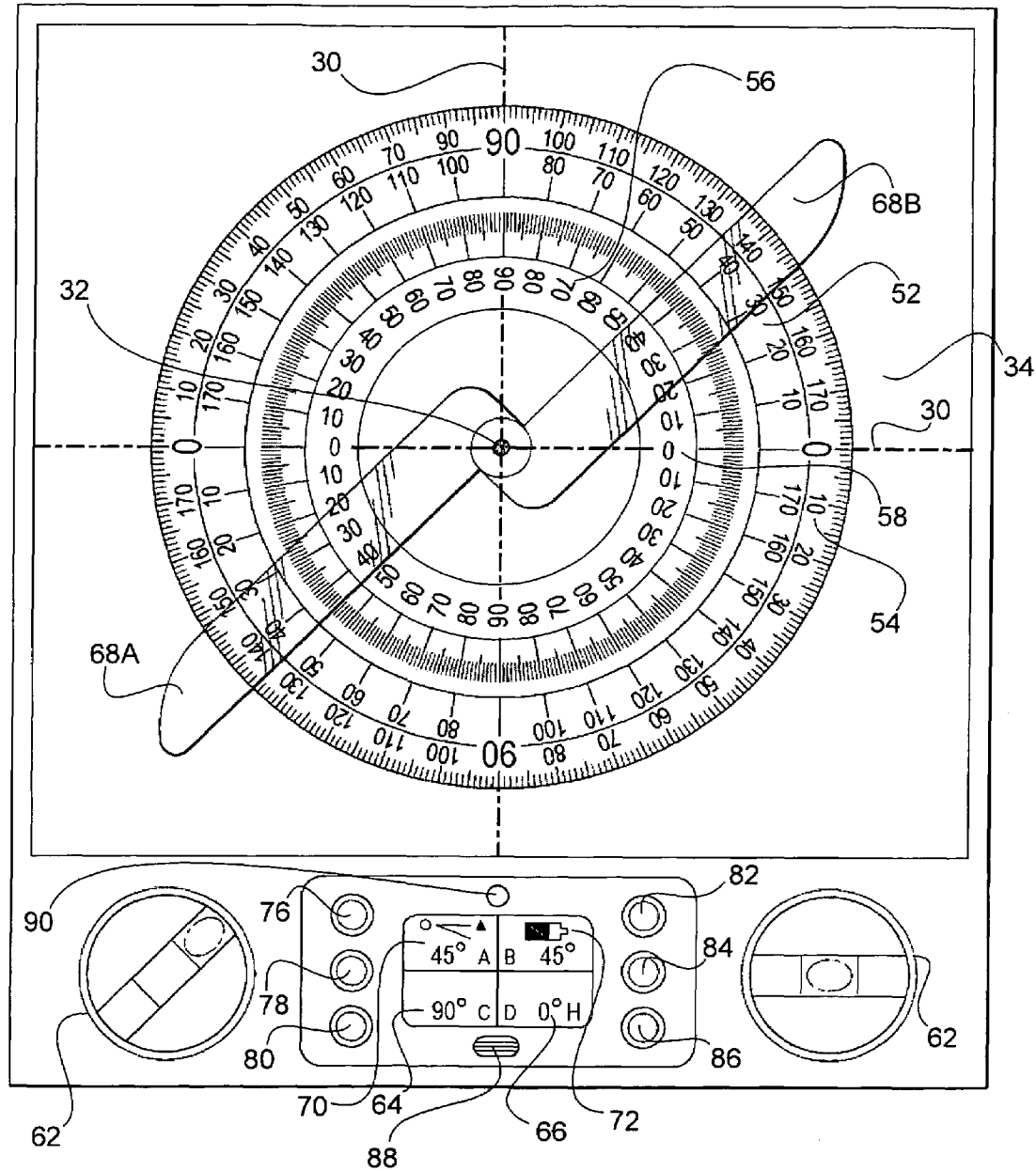
FIG. 8 is an elevation view of yet another embodiment of the invention.

Referring now to FIG. 8 a more sophisticated embodiment has additional features. For example, the protractor has multiple scales. In the embodiment illustrated the middle scale 52 has two 180° scales oriented about the horizontal spatial reference line 30 and the outer scale 54 has four 90° scales. The inner scale 56 is a specialty scale and can measure items such as percent grade of a slope, roof pitch, inches per foot of fall, OSHA angles, etc. The gauge can comprise multiple templates 58 each having different scales which are attached to the window 30 by conventional means. Alternatively, the special scale 56 can be an electronic display which can be changed through a control panel 60.

The gauge also can have an electronic level (not shown) with a digital readout which can be used to align the device with the horizontal, 64, or vertical, 66. The embodiment illustrated includes 90° and 45° bubble indicators 62 which can be used to calibrate the digital level. In the embodiment there are two markers 68A and 68B which can be rotated about the positioning indicia 32. The angle of the marker 68A is indicated in digital readout 70 and the angle of marker 68B is indicated in digital readout 72. A battery level indicator 74 is also provided to show the amount of charge remaining on the rechargeable battery (not shown) which powers the gauge's electronics. A control button 76 activates a back light in the digital readouts. A control button 78 changes the scales and the spatial scale 56. A control button 80 holds the readings in the various digital readouts when pressed once and clears the readings when pressed twice. A control 82 allows the reading in the digital readouts to be stored in memory. A control button 84 zeros the digital readouts when pressed once and sets them to predetermine levels when pressed twice. A control button 84 turns on or off an audible system (not shown) which announces angles through a speaker 88. A light 90 illuminates when a preset angle is reached.

Figure 10:
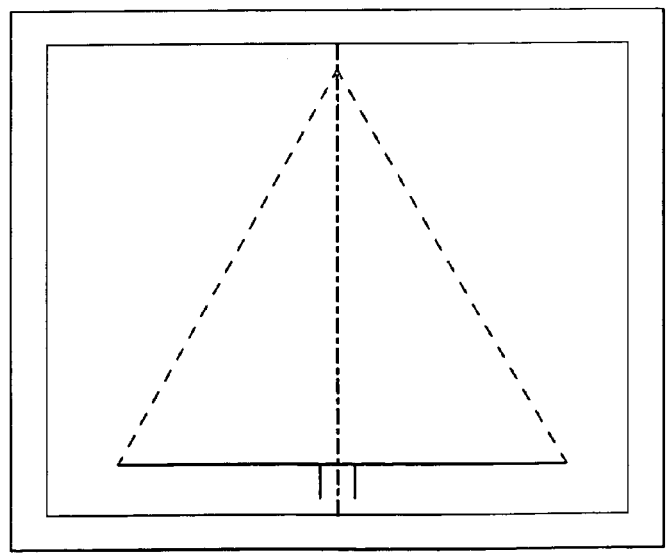
FIG. 10 is an elevation view of another embodiment of the invention.

A final embodiment, shown in FIG. 10 is used in shearing Christmas trees to insure that they have the proper proportions after they are sheared.

Figure 9:
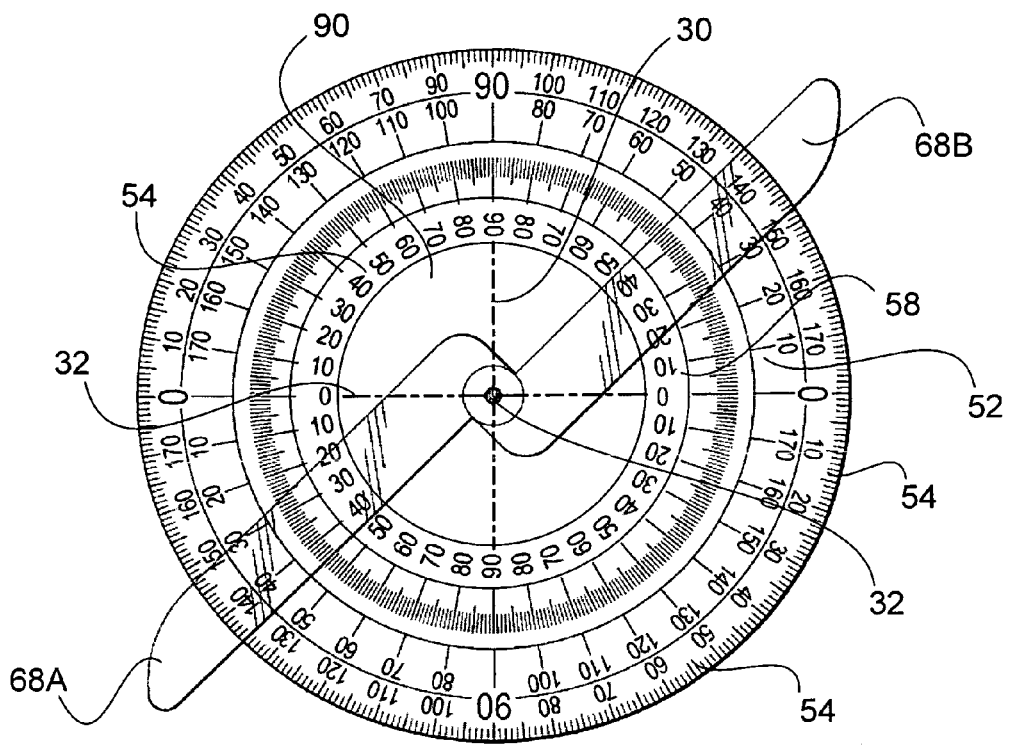
FIG. 9 is an elevation view of still another embodiment of the invention.

Referring to FIG. 9 the entire panel 90 can be transparent and serve as the window. For simplicity of use the panel can be circular which makes it easier to rotate.

The terms and expressions which have been employed in the foregoing specification are used therein as terms of description and not of limitation, and there is not intention, in the use of such terms and expressions, of excluding equivalents of the features shown and described or portions thereof, it being recognized that the scope of the invention is defined and limited only by the claims which follow.

I claim:

1. A device for determining the angle of a remote rectilinear object relative to a specific reference line comprising:
   (a) a panel which is configured to be held in front of a user;
   (b) said panel including a transparent window which allows a user to see completely through said panel and view a remote rectilinear object located behind said panel;
   (c) said window having a positioning indicia located thereon;
   (d) a spatial reference associated with said panel;
   (e) at least one radial line extending at least partial across said window from said positioning indicia; wherein
   (f) a user looking through said window can simultaneously see said panel and said remote rectilinear object in order to determine the angle of said remote rectilinear object relative to said specific reference line by aligning said spatial reference in an established manner with respect to said specific reference line with said positioning indicia overlying said rectilinear object, using said at least one radial line.

2. The device of claim 1 wherein said rectilinear object is an edge of said window.

3. The device of claim 1 wherein said rectilinear object is a line inscribed on said window.

4. The device of claim 1 wherein said rectilinear object is a level indicator located on said gauge.

5. The device of claim 2 wherein said at least one radial line is a protractor located on said window, said protractor having a center point which is located at said positioning indicia.

6. The device of claim 5 wherein said at least one radial line is multiple protractors located on said window.

7. The device of claim 6 including templates which are releasably attached to said window and at least one of said multiple protractors is located on said template.

8. The device of claim 1 wherein said at least one radial line is movable about said positioning indicia.

9. The device of claim 8 including a pointer which is rotatable about said positioning indicia and said at least one radial line is located on said pointer.

10. The device of claim 8 wherein said at least one radial line is electronically displayed on said window.

11. The device of claim 1 wherein said window includes all of said panel.

12. The device of claim 11 wherein said panel is circular.

* * * * *

UNITED STATES PATENT AND TRADEMARK OFFICE
CERTIFICATE OF CORRECTION

| | |
|---|---|
| PATENT NO. | : 7,891,107 B2 |
| APPLICATION NO. | : 12/584406 |
| DATED | : February 22, 2011 |
| INVENTOR(S) | : Timothy J. Marcum |

It is certified that error appears in the above-identified patent and that said Letters Patent is hereby corrected as shown below:

At column 4, line 57, please change "A control button 84" to --A control button 86--.

Signed and Sealed this
Fourth Day of October, 2011

David J. Kappos
*Director of the United States Patent and Trademark Office*